(12) United States Patent
Koenig et al.

(10) Patent No.: US 6,446,998 B1
(45) Date of Patent: Sep. 10, 2002

(54) DEVICE FOR DETERMINING A DISTANCE OF A MOTOR VEHICLE FROM AN OBJECT

(75) Inventors: Winfried Koenig, Pfinztal; Johannes Eschler, Ditzingen; Reinhold Fiess, Durbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/468,006

(22) Filed: Dec. 20, 1999

(30) Foreign Application Priority Data

Jan. 20, 1999 (DE) .......................... 199 01 953

(51) Int. Cl.[7] .............................. B60T 7/20; B62D 53/06
(52) U.S. Cl. .................... 280/432; 180/169; 280/446.1; 340/932.2; 340/431; 340/432
(58) Field of Search ............................ 280/432, 446.1, 280/449, 455.1, 457; 180/271, 170, 169, 204; 340/904, 932.2, 958, 961, 431, 435, 436, 687, 686.6; 701/300, 301

(56) References Cited

U.S. PATENT DOCUMENTS

| | | | |
|---|---|---|---|
| 3,948,567 A | * | 4/1976 | Kasselmann et al. .......... 303/7 |
| 4,254,998 A | | 3/1981 | Marshall et al. |
| 5,152,544 A | * | 10/1992 | Dierker, Jr. et al. ........ 280/432 |
| 5,191,328 A | * | 3/1993 | Nelson .................. 340/870.06 |
| 5,330,020 A | | 7/1994 | Ketcham |
| 5,455,557 A | | 10/1995 | Noll et al. |
| 5,516,252 A | | 5/1996 | Francke et al. |
| 5,574,426 A | * | 11/1996 | Shisgal et al. .............. 340/435 |
| 5,646,614 A | * | 7/1997 | Abersfelder et al. ..... 340/932.2 |
| 5,690,347 A | | 11/1997 | Juergens et al. |
| 5,734,336 A | * | 3/1998 | Smithline ................... 180/168 |
| 6,184,782 B1 | * | 2/2001 | Oda et al. ................... 340/435 |

FOREIGN PATENT DOCUMENTS

| | | |
|---|---|---|
| DE | 35 03 352 | 10/1986 |
| DE | 41 27 750 | 9/1992 |
| DE | 42 07 903 | 9/1993 |
| EP | 0 495 242 | 12/1992 |
| GB | 2222560 | 3/1990 |
| GB | 2344481 | 7/2000 |
| WO | WO99/51996 | 10/1999 |

* cited by examiner

*Primary Examiner*—Anne Marie Boehler
(74) *Attorney, Agent, or Firm*—Kenyon & Kenyon

(57) ABSTRACT

A device for determining a distance between the back of a motor vehicle and an object located behind the motor vehicle, including a sensor arrangement for detecting a distance between at least one location on the back of the motor vehicle and a location at the side of the object facing the vehicle, and an evaluation unit for determining distance values on the basis of the detected sensor signals, the evaluation unit including an arrangement for ascertaining a periodic nature of the determined distance values.

23 Claims, 3 Drawing Sheets

DEVICE FOR DETERMINING A DISTANCE OF A MOTOR VEHICLE FROM AN OBJECT

FIELD OF THE INVENTION

The present invention relates to a device for determining a distance of a motor vehicle from an object located behind the motor vehicle, devices for stabilizing vehicle-trailer combinations including a towing vehicle and a trailer, as well as to a corresponding method for stabilizing vehicle-trailer combinations.

BACKGROUND INFORMATION

Passenger cars having trailers, for example towing vehicle-caravan combinations, have a tendency for instable vehicle performance above certain critical velocities. In this context, the trailer starts to execute periodic, self-reinforcing pendulum-type motions about the trailer coupling of the passenger car. The described effect typically occurs when driving on downhill grades, since, here, the increase in velocity, for example, is not noticed by the driver, or may also be brought about intentionally. Gusts of wind and passing vehicles may set off such pendulum-type motions as well. In the case of inexperienced drivers, this may result in their losing control over the combination, causing, for example, the trailer to buckle or the coupling to tear off. The combination can be stabilized again in such situations by timely braking.

U.S. Pat. No. 5,690,347 describes a control device for a tractor trailer which, in the case that an oscillatory movement of the trailer is sensed, automatically activates a computer-controlled braking system. In this context, an infrared sensor system is used to determine the axle position of the trailer relative to the tractor. A system of that kind requires relatively high provision expenses, and is therefore only used in the commercial vehicle sector.

European Patent No. EP 0 495 242 describes an anti-buckle brake control method for a flexibly coupled trailer. In this context, a buckling angle between a towing vehicle and trailer, as well as the time derivation of this buckling angle is used to detect a trailer oscillation. Here as well, such a device is exclusively described in connection with a commercial vehicle.

Finally, German Patent No. DE 35 03 352 describes a park-distance measuring indicator for a passenger car. Since difficulties often arise in the parking of passenger vehicles, it proposes mounting, at the front and/or at the back of the vehicle, a drawer-type device having a built-in ultrasonic transmitting device and/or light-radiation device, which is connected to a digital display in the dashboard area. Park-distance measuring indicators of this kind can be provided in an inexpensive manner, so that they have been widely used in the passenger car sector as well.

SUMMARY

An object of the present invention is to provide a cost-effective way to recognize or avoid oscillatory movements of a trailer coupled to a motor vehicle.

This objective is achieved by a device for determining the distance of a motor vehicle from an object located behind the motor vehicle.

The device according to the present invention makes it possible to achieve significant gains in safety in an inexpensive manner in the operation of trailers for motor vehicles. Sensors and sensor signals conventionally used in connection with a park distance control can be used in a simple manner for a further application, namely for recognizing or for avoiding oscillatory or wobble movements of a trailer. Sensor signals are evaluated to ascertain a periodic nature of the distance of a trailer from the motor vehicle, with very little outlay, using suitable processors and software. Compared to conventional park distance controls having only one function, only insignificant additional costs result. Thus, provision can be made in accordance with the present invention to equip an existing park distance control with an additional function, namely the detection of a trailer pendulum-type motion. This means, if a pendulum-type motion of the trailer is recognized in the control unit of the park distance control, then this control unit outputs a corresponding signal, which can be fed, inter alia, to other control units. Moreover, it is possible for the control unit or the evaluation device of the device according to the present invention to route the sensor signals and/or the distance signals to a further control unit, where a trailer pendulum-type motion is then evaluated.

The sensor device may include two sensors, which, in particular, are arranged on opposite sides of the vehicle's longitudinal axis, at the back of the vehicle. In this case, a slewing motion of the trailer can be determined, for example, by performing a subtraction operation on the individual distance values sensed by the two sensors. An arithmetical evaluation of the differential values calculated in this way for determining an oscillatory or wobble condition proves to be particularly easy. Besides using two sensors, the use of more than two sensors is also possible. For example, in commercial vehicles, typically four, six or eight sensors are used. Because a plurality of sensors are available concurrently for monitoring, the reliability of the system is enhanced.

According to one advantageous embodiment of the device according to the present invention, the sensor device includes ultrasonic sensors. Sensors of this kind can be obtained inexpensively, and are very rugged and reliable.

In accordance with another embodiment, the sensor device includes capacitive sensors. In this context, the clearance between the motor vehicle and the object serves as a variable dielectric.

Moreover, it is also possible for the sensor device to include electromagnetic radiation sensors, for example, microwave sensors or optical sensors. These sensors perform very accurately, and are likewise rugged and reliable.

The sensor device according to the present invention may be mounted in the rear bumper of the motor vehicle. This arrangement optimally ensures the functioning of the sensors, both for determining a trailer pendulum-type motion and for determining the distance of the motor vehicle from a stationary obstacle, for example, when backing up into a parking space.

The object according the present invention is further achieved by a device incorporating a device for indicating a critical pendulum-type motion of the trailer is present and/or a device for reducing the velocity of the vehicle below a predefinable critical velocity. using such a device, it is possible in a simple manner to detect pendulum-type motions of the trailer and to warn the driver accordingly. As a result, safety is considerably increased, particularly for towing vehicle-caravan combinations. This device expediently has means for reducing the velocity of the vehicle below a critical velocity. This also makes it possible to avoid dangerous situations, which occur, for example, when the driver is inattentive. To reduce the vehicular velocity, engine interventions are also conceivable apart from interventions in the wheel brake of the motor vehicle or towing vehicle.

The object according the present invention is further achieved by providing a device for stabilizing a vehicle-trailer combination made up of a towing vehicle and a trailer. The stabilizing device may include a distance determining device used to ascertain at least one distance quantity which describes the distance of one location of the towing vehicle to an object located behind the towing vehicle. The distance determining device may include at least one measuring device which is attached to the rear part of the towing vehicle. At least one distance quantity, in the case that no trailer is coupled to the towing vehicle, is evaluated to support a parking operation. The at least one distance quantity, in the case that a trailer is coupled to the towing vehicle, is evaluated to detect a trailer instability, in particular, to detect a pendulum-type motion of the trailer referred to the longitudinal axis of the towing vehicle. Braking interventions and/or engine interventions may be carried out in response to an existing instability to stabilize the vehicle-trailer combination, and/or a signal transmitter is actuated in response to an existing instability.

The distance determining device may include two measuring devices, a distance quantity being determined with the assistance of each measuring device. Using this measure, on one hand, very accurate measurements are possible, on the other hand, a stabilization of the vehicle-trailer combination can be maintained in case one measuring means fails.

It may be advantageous to determine an angular quantity as a function of the two distance quantities, the angular quantity describing the angle formed by the longitudinal axis of the towing vehicle and by the longitudinal axis of the trailer, and to determine as a function of this angular quantity whether or not trailer instability exists. Such an angle can be derived in a simple manner from the determined distance quantities.

To determine whether or not trailer instability exists, a first frequency quantity describing the frequency of the at least one distance quantity, and/or a first amplitude quantity describing the amplitude of the at least one distance quantity, and/or a second frequency quantity describing the frequency of the angular quantity, and/or a second amplitude quantity describing the amplitude of the angular quantity is expediently evaluated. To determine whether or not trailer instability exists, it proves to be advantageous to further evaluate a velocity quantity describing the velocity at least of the towing vehicle. Using this measure, the monitoring of the stability of the vehicle-trailer combination can be adapted to different velocities in an optimal manner.

Trailer instability expediently exists when the velocity quantity is greater than a first threshold value, and when the first amplitude quantity is greater than a second threshold value and/or when the first frequency quantity is greater than a third threshold value, or when the second amplitude value is greater than a fourth threshold value, and/or when the second frequency quantity is greater than a fifth threshold value.

It may be useful to ascertain whether or not the instability of the trailer is subsiding, no braking interventions and/or engine interventions being carried out, or these being terminated, in the case that the instability is subsiding.

It is expediently decided that trailer instability is subsiding when the velocity quantity is greater than a first threshold value, and when the first amplitude quantity and/or when the first frequency quantity decreases, or when the second amplitude quantity and/or when the second frequency quantity decreases.

The device according to the present invention may be designed in such a manner that, to recognize whether a trailer is coupled, it is determined if a brake light cable of the trailer is connected to the towing vehicle, and/or it is determined if the at least one distance quantity exhibits a previously known behavior in predetermined driving situations, or that the at least one distance quantity is evaluated to determine the instability of the trailer when a quantity describing the vehicular velocity is greater than a corresponding threshold value.

The object of the present invention is finally achieved by a method utilizing determined distances to assist in parking, detecting instability, notification of instability, and performing braking and/or engine interventions to correct the instability. With the assistance of this method, a stabilization of a vehicle-trailer combination can be carried out in a simple manner, particularly, using one of the devices according to the present invention.

DETAILED DESCRIPTION

Figure 1:
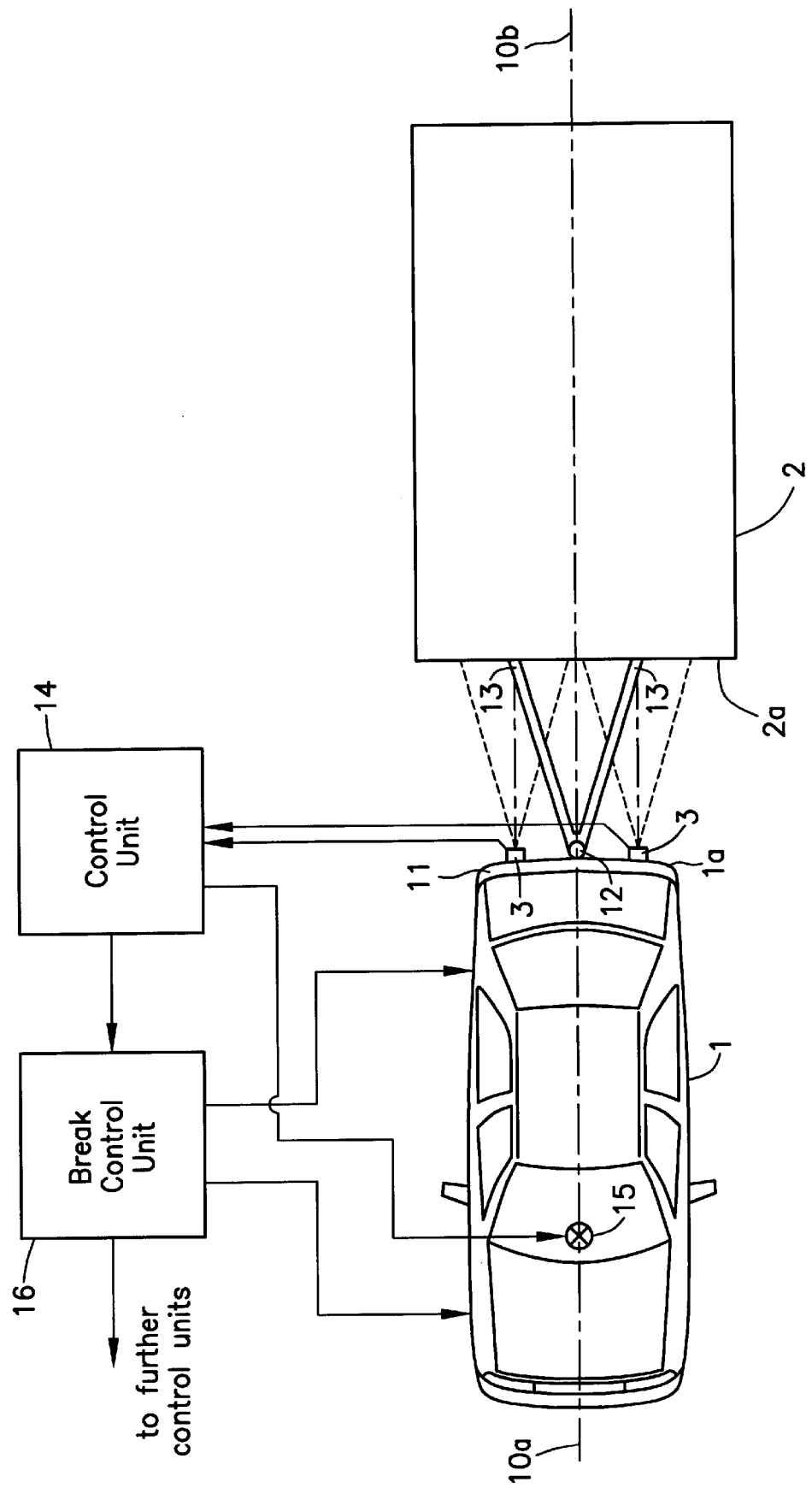
FIG. 1 shows a schematic top view of a motor vehicle-trailer combination equipped with the devices according to the present invention in a first condition.

A motor vehicle-trailer combination includes a motor vehicle 1 and a trailer 2. Trailer 2 is attached to motor vehicle 1 in a conventional manner via a trailer coupling 12 and connecting bars 13. At its rear part 1a, motor vehicle 1 has a bumper 11, in which (schematically shown) ultrasonic sensors 3 are integrated on the left and right side, respectively. Sensors 3 each measure the distance to front wall 2a of trailer 2. In the condition shown in FIG. 1 (straight-on drive, motor vehicle and trailer have coinciding longitudinal axes 10a, 10b), sensors 3 each measure the same distance. The sensor signals are evaluated in a control unit 14. Control unit 14 is a control unit, which is known per se, of a park distance control, or rather reversing aid, which, when backing vehicle 1 up into a parking space (i.e., without trailer 2), evaluates sensor signals and outputs an alarm signal when back 1a of vehicle 1 gets too close to an obstacle.

Figure 2:
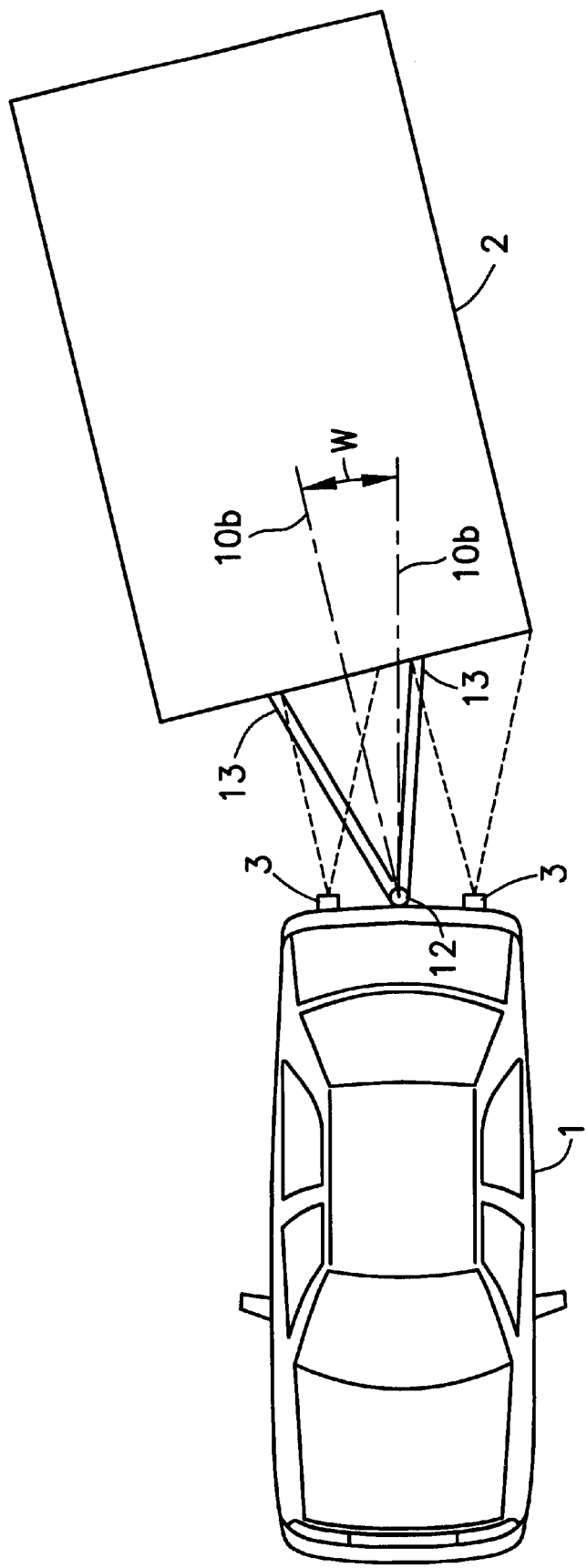
FIG. 2 shows a schematic top view of the motor vehicle-trailer combination equipped with the devices according to the present invention of FIG. 1 in a second condition.

According to the present invention, control unit 14 is enhanced by a further function. With the assistance of the sensor signals, control unit 14 is capable of determining whether the two distances between motor vehicle 1 and trailer 2, measured by sensors 3, are different. If this is the case, it is inferred that longitudinal axes 10a, 10b of motor vehicle and trailer, respectively, have an angle W of a specific amplitude relative to each other, as is shown in FIG. 2. This will be the case during maneuvering and during normal cornering. Such a situation is recognized as uncritical, so that control unit 14 does not trigger any further signals or control operations. Control unit 14 is further capable of determining and processing also the frequency of angle W in addition to the amplitude. Additionally, for example, with the assistance of a motor control unit (not shown), control unit 14 is supplied with a signal for representing the velocity of the motor vehicle. A corresponding signal may also be made available, for example, by a brake control unit. It is also possible to derive the vehicular velocity directly from the determined wheel speeds. Using this information, control unit 14 is able to derive whether combination 1, 2 threatens to become instable, for example, in the case of an increasing pendulum-type motion. It is also possible to recognize whether the pendulum-type motion dies out alone so that no measures are required. Besides determining or evaluating the angle, it is also possible to evaluate the determined distance signals. For this purpose, for example, the one distance signal is monitored as to whether it exhibits an oscillating behavior. If this is the case, a pendulum-type motion of the trailer is present. To this end, however, a calibration is carried out from time to time. This means, in suitable driving situations (e.g., a straight-on drive), the distance signal is determined, and, starting from whether an oscillating behavior can be sensed, is stored as a comparison value.

In the case of a threat of instability, control unit 14 generates an alarm signal in the passenger compartment via a signal transmitter 15, or initiates a braking operation via a brake control unit 16, for example, by actuating the wheel brakes of the front and/or rear axle of the motor vehicle, to bring the vehicle below a critical velocity which can be predefined. Additionally, further supporting measures can be taken via further control units not shown in detail. The device according to the present invention can be used, in particular, in connection with ABS/ASR systems (anti-lock braking system/anti-spin regulation), or FDR systems (driving dynamics regulation).

Thus, the device according to the present invention can be used both within the framework of a park distance control or reversing aid, and within the framework of a safety device for stabilizing motor vehicle-trailer combinations. With the assistance of suitable selecting means, the driver can be put in a position to select one of the two functions. Besides this manual selection by the driver, an automatic selection is also possible. An automatic selection has the advantage that a trailer pendulum-type motion recognition, provided that certain prerequisites are fulfilled, can always be active.

To implement such an automatic selection, several possibilities present themselves:
Normally, the velocity of the vehicle is not very high during a parking operation. Consequently, it would be conceivable to use the park distance control above a predefined velocity value for recognizing a trailer pendulum-type motion. The automatic selection can be achieved by a threshold interrogation for the vehicular velocity.

The determination whether a trailer pendulum-type motion is present is only of interest when a trailer is actually coupled to the towing vehicle. Consequently, the park distance control for recognizing a trailer pendulum-type motion may be used when a trailer coupled to the towing vehicle is recognized. For example, a coupled trailer may be recognized via the connection of its brake light cable to the towing vehicle. To this end, a self-holding relay may be provided in the towing vehicle which operates when the brake light cable of a trailer is connected to the receptacle of the towing vehicle, and thus, an electric circuit is established. Alternatively, it is possible to evaluate the distance signal generated with the assistance of the park distance control for a specific characteristic property. If, in fact, a trailer is coupled to the towing vehicle, then the distance signal has a value different from zero, which does not change, for example, during a relatively long straight-on drive, which can be sensed with the assistance of a steering angle sensor or by evaluating the wheel speeds. In case a straight-on drive cannot be sensed for lack of suitable sensors, the observation of the average value of the distance signal, for example, would provide a solution.

Figure 3:
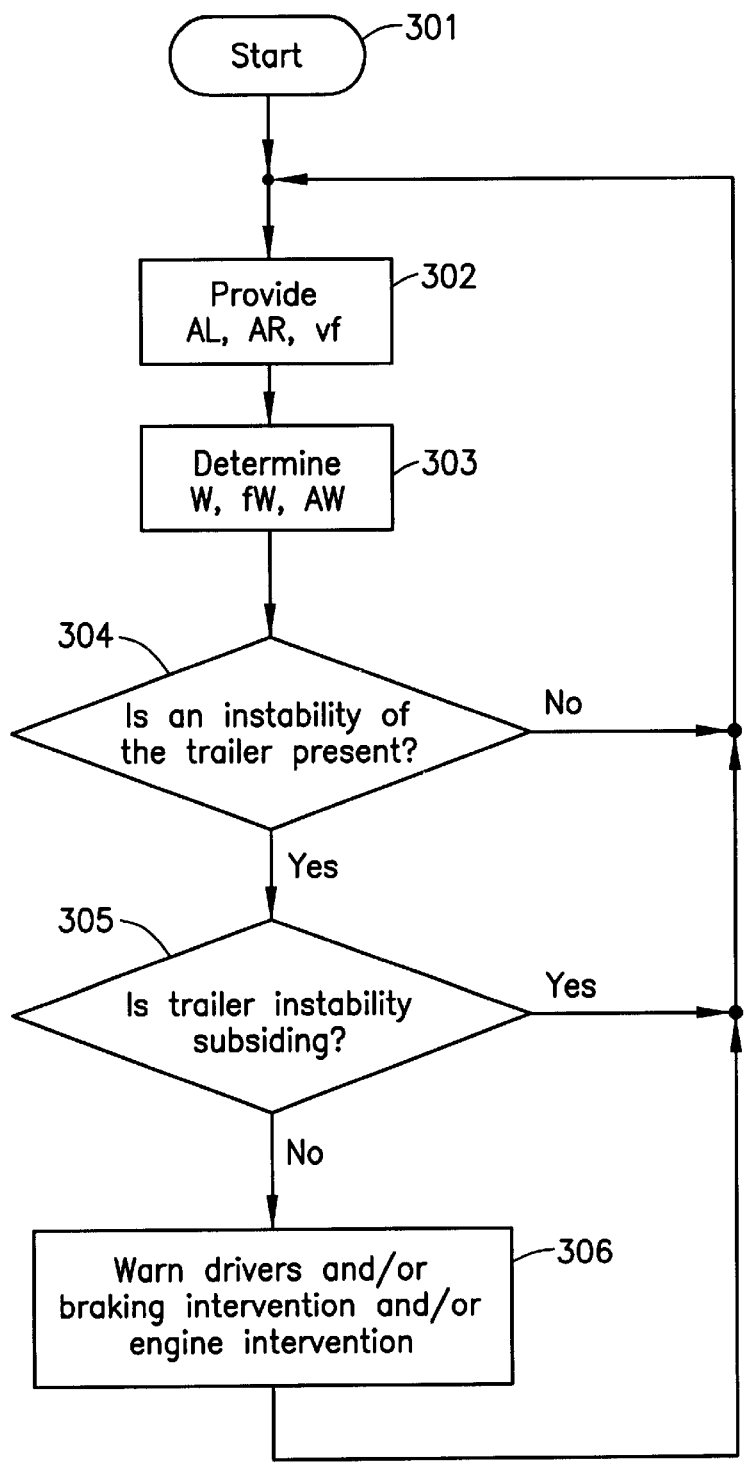
FIG. 3 shows a flow chart to represent the mode of functioning of a preferred embodiment of the device according to the present invention and of the method according to the present invention, respectively.

The mode of functioning of the shown embodiment of the device according to the present invention is now explained by way of example on the basis of the flow chart shown in FIG. 3. The individual steps therein have the following meaning:

The method according to the present invention starts with a step 301 followed by a step 302, in which two distance signals AL (left sensor), AR (right sensor) as well as the vehicular velocity vf are made available.

In a step 303, angular quantity W is determined: For each sensor, the distance AL or AR, respectively, to the front wall of the trailer is known. From these two distances, the difference is calculated. Additionally, the sensor distance at which the sensors are mounted on the vehicle is known. The tangent of the angle formed by the two longitudinal axes (towing vehicle and trailer) results from the difference and the sensor distance using division. Apart from the method described above, the determination of the angle with the assistance of a triangulation method, in which distance relations or angular relations are evaluated as well, would also provide a solution.

The amplitude AW of the angular quantity is determined from the maximum value of the angular quantity between two passages through zero. To determine the frequency fW of the angular quantity, an evaluation of the maxima of the signal AW would provide a solution. For this, for example, the positive maxima are determined, and the time between them is determined using a counter. This time represents a measure for frequency fW. Secondly, the time derivation of quantity AW can be calculated, and the time interval of the individual zero values of the derivative be determined.

In subsequent step 304, it is determined whether an instability of the trailer is present: An instability is present when the vehicular velocity is greater than a corresponding threshold value and when, at the same time, amplitude AW is greater than a corresponding threshold value and/or when frequency fW is greater than a corresponding threshold value. Additionally, the evaluation of the time derivation of signal fW offers itself, in particular, the determination whether this time derivation has exhibited high values in one of the previous periods of time.

If, in step 304, it is determined that an instability is present, where stabilizing interventions or a warning of the driver are probably required, then a step 305 is carried out subsequent to step 304. If, in step 304, however, it is determined that no instability is present, then no stabilizing interventions or no warning of the driver are required, then step 302 is carried out again subsequent to step 304.

In step 305, it is determined whether the instability of the trailer is subsiding: For this, it is examined whether in a driving situation in which the vehicular velocity is greater than the threshold value, the value of signal AW and the value of signal fW are decreasing.

If, in step 305, it is determined that the instability is subsiding, no stabilizing interventions or no warning of the driver are required, then step 302 is carried out again subsequent to step 305. If, in step 305, however, it is determined that the instability is not subsiding, thus, stabilizing interventions or a warning of the driver are required, then a step 306 is carried out subsequent to step 305. In this step, the driver is warned as already described above. Additionally or alternatively, braking interventions and/or engine interventions are carried out to stabilize the vehicle-trailer combination. Subsequent to step 306, step 302 is carried out again.

In a corresponding manner, for an individual distance quantity, the appertaining amplitude quantity or the frequency quantity can be determined or evaluated, respectively.

What is claimed is:

1. A device for determining a distance between a rear part of a motor vehicle and an object located behind the motor vehicle, comprising:
    a sensor arrangement detecting a distance between at least one location at the rear part of the motor vehicle and a location at a side of the object facing the motor vehicle, the sensor arrangement providing sensor signals as a function of the detected distance; and
    an evaluation unit determining distance values as a function of the sensor signals, the evaluation unit including an arrangement ascertaining a periodic nature of the determined distance values.

2. The device according to claim 1, wherein the sensor arrangement includes at least two sensors arranged at the back of the vehicle and on opposite sides of a longitudinal axis of the vehicle.

3. The device according to claim 1, wherein the sensor arrangement includes ultrasonic sensors.

4. The device according to claim 1, wherein the sensor arrangement includes capacitive sensors.

5. The device according to claim 1, wherein the sensor arrangement includes electromagnetic radiation sensors.

6. The device according to claim 1, wherein the electromagnetic radiation sensors include at least one of microwave sensors and optical sensors.

7. The device according to claim 1, wherein the sensor arrangement is mounted in a rear bumper of the motor vehicle.

8. A device for stabilizing a motor vehicle-trailer combination, comprising:
    a sensor arrangement detecting a distance between a rear part of the motor vehicle and a side of the trailer facing the motor vehicle, the sensor arrangement providing sensor signals as a function of the detected distance;
    an evaluation unit determining distance values as a function of the sensor signals, the evaluation unit including an arrangement ascertaining a periodic nature of the determined distance values; and
    at least one of:
        i) an arrangement for indicating that a critical pendulum motion of the trailer is present as a function of the determined distance values; and
        ii) an arrangement for reducing a velocity of the motor vehicle below a critical velocity as a function of the determined distance values.

9. A device for stabilizing a vehicle-trailer combination, the vehicle-trailer combination including a towing vehicle and a trailer, the device comprising:
    at least one measurement device mounted on a rear part of the towing vehicle; and
    a determining arrangement coupled to the at least one measurement device determining at least one distance quantity which describes a distance between a location of the towing vehicle and an object located behind the towing vehicle, the at least one distance quantity being evaluated to support a parking operation when the trailer is not coupled to the towing device, and the at least one distance quantity being evaluated to determine trailer instability when the trailer is coupled to the towing device the determination of trailer instability including determining a pendulum motion of the trailer relative to a longitudinal axis of the towing vehicle, at least one of braking interventions, engine interventions and an activation of a signaling device are carried out in response to a determination of trailer instability.

10. The device according to claim 9, wherein the at least one measurement device includes two measuring devices, and the distance quantity is determined with the aid of each of the two measuring devices.

11. The device according to claim 10, wherein the determining arrangement determines an angular quantity as a function of two distance quantities, the angular quantity describing an angle formed by the longitudinal axis of the towing vehicle and by a longitudinal axis of the trailer, trailer instability being determined as a function of the angular quantity.

12. The device according to claim 11, wherein to determine the trailer instability, the determining arrangement evaluates at least one of:
    i) a first frequency quantity describing a frequency of the at least one distance quantity,
    ii) a first amplitude quantity describing an amplitude of the at least one distance quantity,
    iii) a second frequency quantity describing a frequency of an angular quantity, and
    iv) a second amplitude quantity describing an amplitude of the angular quantity.

13. The device according to claim 9, wherein a velocity quantity describing a velocity of the towing vehicle is evaluated to determine the trailer instability.

14. The device according to claim 12, wherein the determination of trailer instability is made when a velocity quantity is greater than a first threshold value, and at least one of the following occurs:
    i) the first amplitude quantity is greater than a second threshold value,
    ii) the first frequency quantity is greater than a third threshold value,
    iii) the second amplitude quantity is greater than a fourth threshold value, and
    iv) the second frequency quantity is greater than a fifth threshold value.

15. The device according to claim 12, wherein the determining arrangement determines whether the trailer instability is subsiding, wherein when trailer instability is subsiding, at least one of:
    i) no braking intervention is performed,
    ii) no engine intervention is performed, and
    iii) the at least one of braking interventions and engine interventions is terminated.

16. The device according to claim 15, wherein the determination arrangement determines that the trailer instability is subsiding when a velocity quantity is greater than a first threshold value, and at least one of the following exists:
    i) the first amplitude quantity decreases,
    ii) the first frequency quantity decreases,
    iii) the second amplitude quantity decreases, and
    iv) the second quantity decreases.

17. The device according to claim 9, wherein the determining arrangement determines whether the trailer is coupled, the determining arrangement determining that the trailer is coupled when at least one of the following occurs:
    i) a brake light cable of the trailer is connected to the towing vehicle, and
    ii) at least one distance quantity exhibits a predetermined quality in predetermined driving situations.

18. The device according to claim 9, wherein the at least one distance quantity is evaluated to determine the trailer instability when a quantity describing a vehicle velocity is greater than a corresponding threshold value.

19. A method for stabilizing a vehicle-trailer combination, the vehicle trailer combination including a towing vehicle and a trailer, comprising:
- determining at least one distance quantity which describes a distance between a location of the towing vehicle and an object located behind the towing vehicle;
- if the trailer is not coupled to the towing vehicle, evaluating the at least one distance quantity to support a parking operation;
- if the trailer is coupled to the towing vehicle, evaluating the at least one distance quantity to determine instability of the trailer;
- if instability of the trailer exists, performing at least one of:
  - i) braking interventions;
  - ii) engine interventions; and
  - iii) actuation of a signal transmitter.

20. The method according to claim 19, wherein the step of determining the at least one distance includes measuring the distance using a measuring device which is attached to a rear part of the towing vehicle.

21. The method according to claim 19, wherein the step of determining the instability of the trailer includes determining a pendulum-type motion of the trailer relative to a longitudinal axis of the towing vehicle.

22. The device according to claim 1, further comprising an arrangement for routing at least one of: a) the sensor signals, and b) the determined distance values to a further device for ascertaining a periodic nature of the determined distance values.

23. The device according to claim 8, further comprising an arrangement for routing at least one of: a) the sensor signals, and b) the determined distance values to a further device for ascertaining a periodic nature of the determined distance values.

* * * * *